United States Patent [19]

Powell

[11] 4,007,953
[45] Feb. 15, 1977

[54] REMOVABLE CAPTIVE COUPLING NUT ASSEMBLY

[75] Inventor: Lloyd James Powell, Newmarket, Canada

[73] Assignee: International Telephone and Telegraph Corporation, New York, N.Y.

[22] Filed: Sept. 10, 1975

[21] Appl. No.: 611,995

[52] U.S. Cl. .............................. 285/321; 285/388; 339/89 R
[51] Int. Cl.² .................. F16L 55/00; F16L 37/08
[58] Field of Search ......... 285/388, 387, 321, 354, 285/277, 393, 276; 339/89 R, 90 R

[56] References Cited

UNITED STATES PATENTS

| 1,096,690 | 5/1914 | Derbyshire | 285/277 X |
|---|---|---|---|
| 1,771,949 | 7/1930 | Blanchard | 285/276 |
| 2,253,018 | 8/1941 | Cowles | 285/388 X |
| 2,299,643 | 10/1942 | Moody | 285/277 X |
| 2,438,107 | 3/1948 | Babbitt | 285/388 |
| 2,453,597 | 11/1948 | Sarver | 285/277 |
| 2,805,089 | 9/1957 | Hansen | 285/321 X |

FOREIGN PATENTS OR APPLICATIONS

| 233,381 | 4/1969 | U.S.S.R. | 285/321 |
|---|---|---|---|
| 432,952 | 9/1967 | Switzerland | 285/321 |

*Primary Examiner*—Thomas F. Callaghan
*Attorney, Agent, or Firm*—Thomas L. Peterson

[57] ABSTRACT

A coupling nut is rotatably mounted on a barrel and retained thereon by the means of a snap ring. The snap ring is formed with forwardly and rearwardly extending tabs at its free ends which cooperate with a slot formed in the outer surface of the barrel and a recess formed in the inner surface of the nut which allows the nut to be assembled onto the barrel and removed therefrom without the use of a tool.

4 Claims, 9 Drawing Figures

FIG. I.

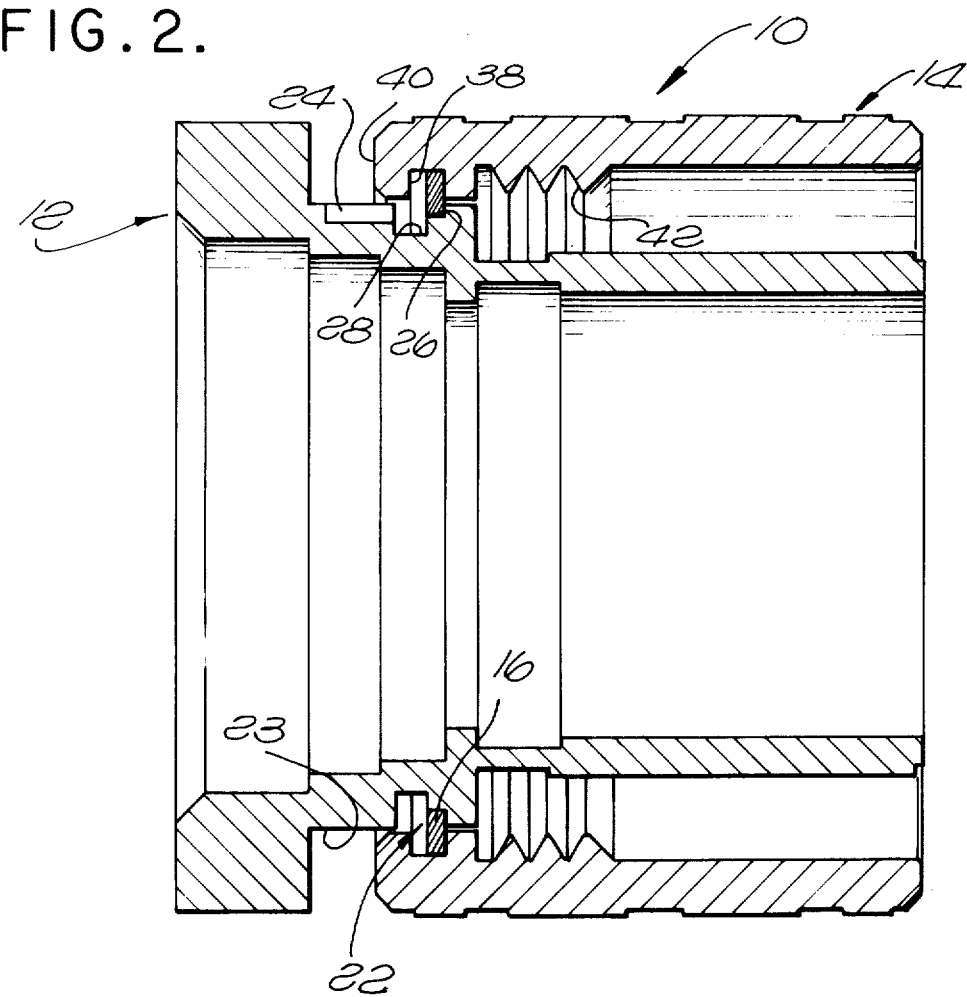
FIG. 2.
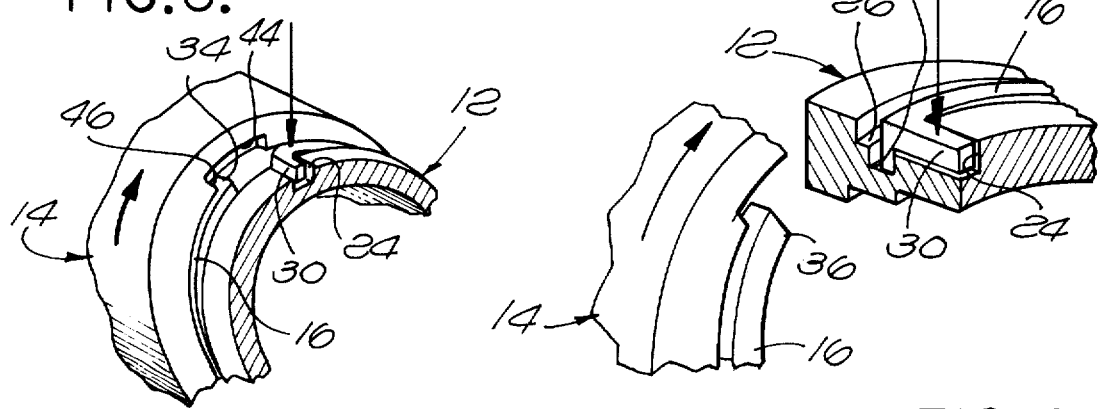
FIG. 3.
FIG. 4.

REMOVABLE CAPTIVE COUPLING NUT ASSEMBLY

BACKGROUND OF THE INVENTION

This invention relates generally to a coupling nut assembly and, more particularly, to a removable captive coupling nut assembly which may be utilized, for example, in an electrical connector.

While the present invention will be described in connection with an electrical connector coupling application, it will be appreciated that it may be also employed for any other coupling application, such as for fluid conducting conduits or the like. In a conventional electrical connector, there is included a plug connector member and a receptacle connector member. Normally the plug connector member comprises a barrel having an internally threaded rotatable coupling nut mounted thereon which is utilized to interengage the receptacle connector member with the plug connector member. The coupling nut is normally retained on the plug barrel by means of a snap ring, which engages in axially aligned grooves formed in the outer surface of the plug barrel and the inner surface of the coupling nut. In order to assemble the nut to the barrel, the snap ring is contracted into the groove in the plug barrel. Thereafter the coupling nut is slid over the barrel, whereupon the snap ring will expand into the outer groove. Once the snap ring expands into the outer groove, the coupling nut is axially retained on the plug barrel and cannot be removed.

Since the coupling nut is permanently assembled on the plug barrel, if there is any requirement for replacement of damaged or defective elements, for example, the plug barrel or the coupling nut, the entire plug connector member must be replaced. The purpose of the present invention is to provide a captive coupling nut assembly which allows the coupling nut to be removed from a barrel upon which it is rotatably mounted and axially retained by a snap ring. It is another purpose of the invention to provide such a removable captive coupling nut assembly in which the coupling nut may be removed from the barrel without the use of any tool, so that disassembly of the parts can be conveniently accomplished in the field.

SUMMARY OF THE INVENTION

According to the principal aspect of the present invention, there is provided a removable captive coupling nut assembly in which a coupling nut is rotatably mounted on a barrel. Means is provided for captivating the nut axially on the barrel. Such captivating means includes an annular groove in the outer surface of the barrel, an annular groove in the inner surface of the nut axially aligned with the barrel groove and a snap ring positioned in both the grooves to axially retain the nut on the barrel. The snap ring, the barrel and nut are specially designed so that the snap ring may be removed from the registering grooves in the barrel and nut thereby allowing the nut to be removed from the barrel. The coupling nut assembly may be disassembled without the use of a tool, thereby permitting replacement of damaged or defective parts without the necessity of discarding or destroying any or all of the remaining parts of the assembly.

BRIEF DESCRIPTION OF THE DRAWINGS

FIG. 2 is a longitudinal sectional view through the coupling nut assembly of the present invention when fully assembled;

FIG. 3 is a fragmentary perspective section taken through the barrel looking in the direction of the coupling nut, showing the tabs on the snap ring positioned in their respective slot and recess in the barrel and coupling nut in the first step of assembling the nut onto the barrel; FIG. 4 is a fragmentary perspective view similar to FIG. 3 but with the barrel also shown in longitudinal section to show how the snap ring is positioned in the deep section of the barrel groove;

DESCRIPTION OF THE PREFERRED EMBODIMENT

Figure 1:
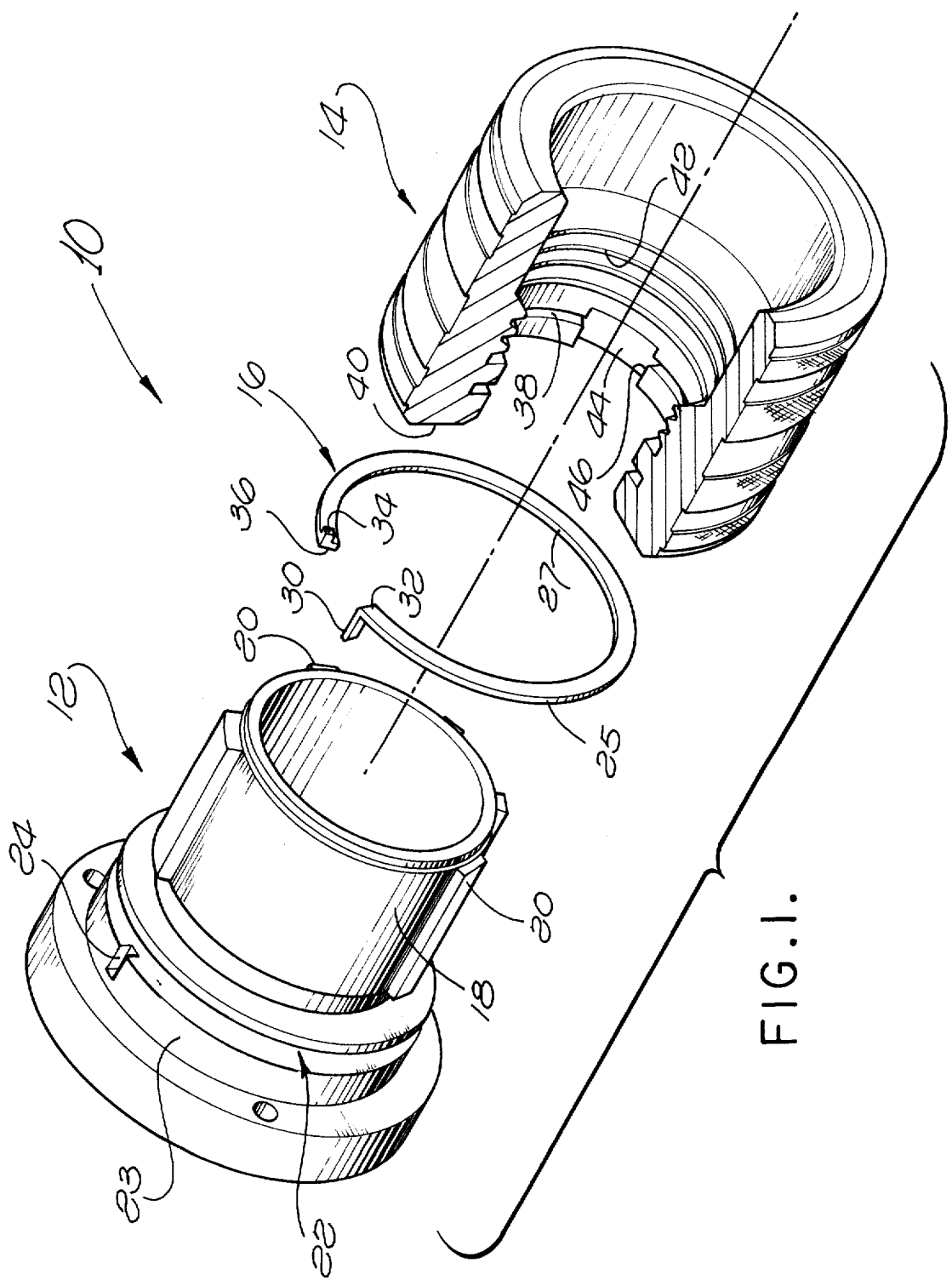
FIG. 1 is an exploded perspective view of the captive coupling nut assembly of the present invention, illustrating the plug barrel snap ring and coupling nut disassembled, with the coupling nut shown in partial section to show the interior thereof.

Referring now to FIGS. 1 and 2 in detail, there is illustrated the captive coupling nut assembly of the present invention, generally designated 10. The assembly includes a barrel 12, a coupling nut 14 and a snap ring 16. As illustrated, the barrel 12 is in the form of a barrel for an electrical connector plug member. The forward portion 18 of the barrel is formed with circumferentially spaced longitudinally extending keys 20 for mating with corresponding keyways formed in the interior of the shell of a mating receptacle electrical connector member, not shown. An annular groove, generally designated 22, is formed in the outer surface of the barrel 12 for receiving the snap ring 16. A longitudinally extending slot 24 extends rearwardly from the groove 22. As seen in FIG. 2, the groove includes a forward shallow section 26 and a rear deep section 28.

The radial thickness of the snap ring 16 is no greater than the depth of the rear deep section 28 of the barrel groove 22. Preferably the thickness of the snap ring is approximately the same as the depth of the rear section 28 of the groove so that the outer surface 25 of the ring is contracted into the groove, as will be explained later. When the snap ring is contracted into the deep section of the groove, the inner surface 27 of the snap ring will engage the bottom of the groove section 28. The snap ring is dimensioned so that when it is in its relaxed condition, which it assumes when the three parts are fully assembled together, its inner diameter is just slightly greater than the diameter of the shallow section 26 of groove 22 and the outer diameter of the snap ring is greater than that of the cylindrical surface 23 of the barrel in which the groove 22 is formed.

Figure 6:
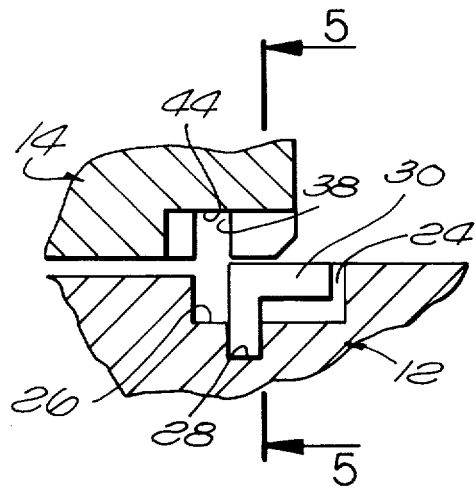
FIG. 6 is a longitudinal sectional view taken along line 6—6 of FIG. 5.

A rearwardly extending tab 30 is formed on one free end 32 of the snap ring 16. A forwardly extending shorter tab 34 is formed on the other free end 36 of the ring. The outer surfaces of the tabs are flush with the outer surface 25 of the ring while the inner surfaces of the tabs are spaced from the inner surface 27 of the ring. The height of the tab 30 is less than the depth of the slot 24 in the barrel 12 and the tab is shorter than the slot so that the tab may be positioned within the slot during assembly, as seen in FIGS. 3, 4 and 6.

Figure 8:
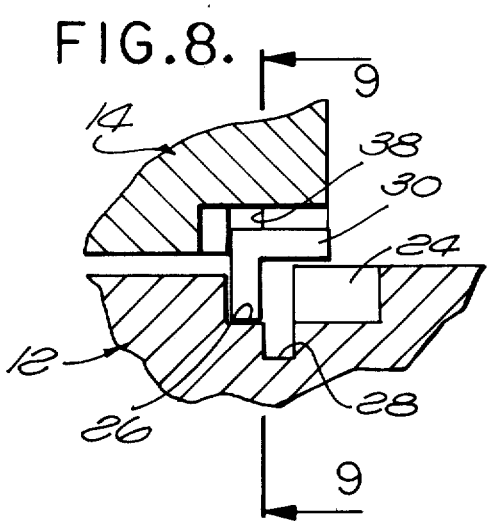
FIG. 8 is a fragmentary longitudinal section through the assembly after the coupling nut is fully assembled to the barrel wherein both tabs on the free ends of the snap ring are positioned within the recess in the coupling nut.
Figure 9:
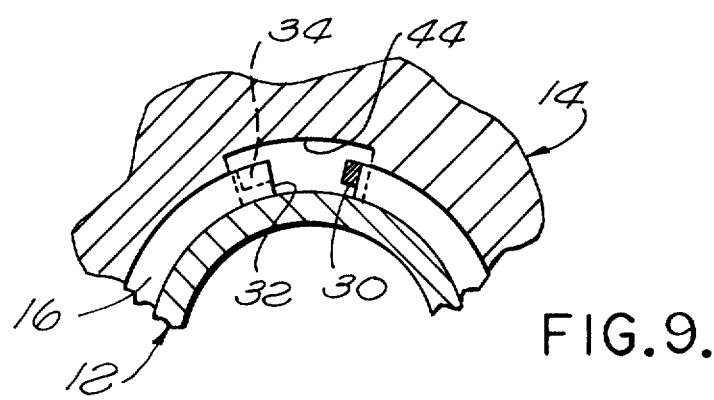
FIG. 9 is a transverse sectional view taken along line 9—9 of FIG. 8.

An annular groove 38 is formed on the inner surface of the coupling nut 14 behind the forward end 40 thereof. The inner surface of the coupling nut behind the groove 38 is threaded, as indicated at 42, for threadedly engaging the externally threaded shell of a mating receptacle connector member, not shown, which would extend into the annular space between the forward portion 18 of the plug barrel and the coupling nut. A generally rectangular recess 44 is formed in the inner surface of the coupling nut 14. The recess intersects the groove 38 and opens at the forward end 40 of the coupling nut. The groove 38 is sufficiently deep so that when the snap ring is positioned in the forward shallow section 26 of the barrel groove 22, as seen in FIGS. 2 and 8, the outer region of the snap ring will extend into the groove 38 to axially retain the coupling nut on the barrel. When the coupling nut is fully assembled on the plug barrel by means of the snap ring 16, as illustrated in FIG. 2, the tabs 30 and 34 are positioned within the recess 44 in the coupling nut, as seen in FIG. 9.

The assembly of the coupling nut to the receptacle barrel is as follows. The snap ring 16 is first slid over the forward portion of the plug barrel until it is aligned with the groove 22. The ring is rotated until the tab 30 is aligned with the slot 24 in the barrel. The tab 30 is pushed into the slot 24 by hand so that the ring is firmly positioned in the groove 22. When the ring is so positioned, the portion of the ring adjacent to the tab 30 will be positioned in the deep section 28 of the groove while the free end 36 portion of the ring will extend outside the cylindrical surface 23 of the barrel, as will the tab 34 as seen in FIG. 3.

Figure 5:
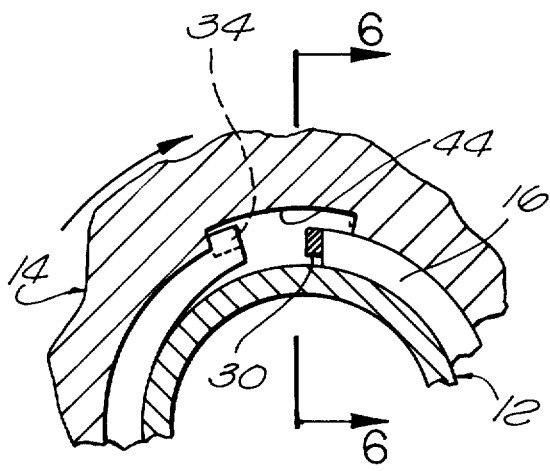
FIG. 5 is a fragmentary transverse section taken along line 5—5 of FIG. 6 showing the position of the coupling nut relative to the barrel and snap ring after initial counterclockwise rotation of the nut, while the snap ring is still in the deep section of the barrel groove.
Figure 7:
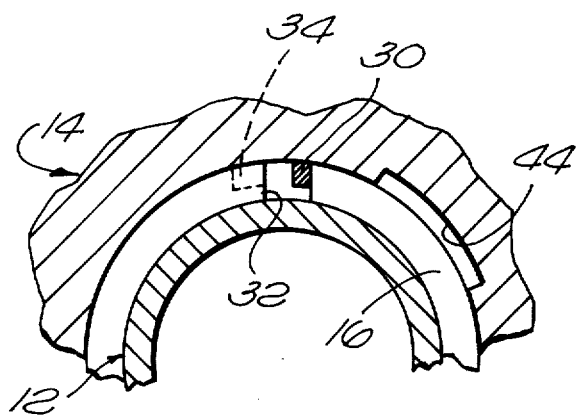
FIG. 7 is a fragmentary transverse sectional view taken through the shallow section of the barrel groove, showing the position of the parts after the coupling nut has been further rotated in a counterclockwise direction and pushed axially toward the barrel so that the snap ring is positioned in the shallow section of the groove.

With the snap ring 16 so positioned on the barrel 12, the coupling nut is positioned to encircle the barrel with the edge 46 of the recess 44 located against the tab 34 on the snap ring as seen in FIGS. 3 and 4. With the tab 30 still held in the slot 24, the coupling nut 14 is rotated in a counterclockwise direction relative to the barrel 12 as indicated by the arrows in FIGS. 3-5, causing the snap ring 16 to wind up or contract into the deep section 28 of the barrel groove. The side of the barrel remote from the recess 44 in the coupling nut is pushed forwardly into the nut and, as rotation continues, the outer surface of the tab 34 on the snap ring will contract flush with the cylindrical surface 23 of the barrel, as seen in FIG. 7, allowing the entire barrel to be slipped into the coupling nut and the snap ring to locate itself in the shallow section 26 of the barrel groove 22. The coupling nut is further rotated until two audible clicks indicate that both the tabs 30 and 34 on the snap ring have expanded into the coupling nut recess 44, as seen in FIGS. 8 and 9, in which position the coupling nut is fully assembled to the barrel 12 by the snap ring. The snap ring is positioned half in the coupling nut groove 38 and half in the shallow section 26 of the barrel groove 22 which prevents undesired removal of the parts and will support very severe axial loading while permitting free rotation of the coupling nut on the barrel.

Removal of the coupling nut is accomplished by rotating the nut until the tab 30 on the snap ring is aligned with the slot 24 on the barrel. The tab is depressed into the slot 24 by hand and the coupling is rotated counterclockwise and simultaneously pulled rearwardly to wind up or contract the ring and permit the tab 30 to enter the interior of the coupling nut. This rotating action is continued almost one complete revolution so that the nut will override the tab 34 on the snap ring. At this point, both tabs on the snap ring are contracted within the coupling nut, and further counterclockwise rotation and pulling of the nut away from the barrel allows the barrel to be removed from the nut. Thus, it is seen that by the present invention no tool is required to remove the coupling nut from the barrel.

The invention has the obvious advantage that if any of the three parts of the assembly 10 are damaged, they may be replaced without discarding the entire assembly. Further, coupling nuts having different threads 42 thereon may be selectively mounted on the barrel 12 either at the time of manufacture or by the user. Further, if a coupling nut is damaged in the field, it may be readily replaced since no tools are required to disassemble the existing nut from the receptacle barrel.

What is claimed is:

1. A removable captive coupling nut assembly comprising:
    a coupling nut rotatably mounted on a barrel, said nut having a forward end;
    means for captivating said nut axially on said barrel;
    said captivating means including an annular groove in the outer surface of said barrel, an annular groove in the inner surface of said nut axially aligned with said barrel groove and a snap ring positioned in both said grooves;
    said captivating means further including:
        a recess in the inner surface of said nut intersecting said nut groove and opening at said forward end of said nut;
        a slot in the outer surface of said barrel extending rearwardly from said barrel groove;
        said snap ring being circular and having spaced free ends within the outer circumference of said circular snap ring;
        a rearwardly extending tab on one of said free ends engageable with said slot and a forwardly extending tab on the other free end engageable with said recess whereby the nut is rotated to contract the snap ring for assembly and disassembly of the coupling nut and the barrel, both of said tabs being positioned within said recess in the assembled position; and
    said captivating means being releasable to allow removal of said nut from said barrel.

2. A removable captive coupling nut assembly as set forth in claim 1 wherein:
    said barrel groove has a forward relatively shallow section and a rear relatively deep section, said snap ring being positioned in said forward section of said groove.

3. A removable captive coupling nut assembly as set forth in claim 1 wherein:

said snap ring has an inner surface and an outer surface;

said tabs being flush with said outer surface and spaced from said inner surface.

4. A removable captive coupling nut assembly as set forth in claim 2 wherein:

the radial thickness of said snap ring is no greater than the depth of said rear section of said barrel groove.

* * * * *